(12) United States Patent
Beaman et al.

(10) Patent No.: US 8,090,683 B2
(45) Date of Patent: Jan. 3, 2012

(54) MANAGING WORKFLOW COMMUNICATION IN A DISTRIBUTED STORAGE SYSTEM

(75) Inventors: Peter D. Beaman, Newton, MA (US); Tuyen M. Tran, Westwood, MA (US); Robert S. Newson, Windsor (GB)

(73) Assignee: Iron Mountain Incorporated, Boston, MA (US)

( * ) Notice: Subject to any disclaimer, the term of this patent is extended or adjusted under 35 U.S.C. 154(b) by 507 days.

(21) Appl. No.: 12/402,469

(22) Filed: Mar. 11, 2009

(65) Prior Publication Data
US 2010/0217931 A1 Aug. 26, 2010

Related U.S. Application Data

(63) Continuation-in-part of application No. 12/391,099, filed on Feb. 23, 2009.

(60) Provisional application No. 61/154,743, filed on Feb. 23, 2009.

(51) Int. Cl.
*G06F 17/00* (2006.01)
(52) U.S. Cl. ........ 707/610; 707/626; 707/651; 707/652; 707/656; 707/658; 707/687; 707/692
(58) Field of Classification Search .................. 707/610, 707/626, 651, 652, 656, 658, 687, 692
See application file for complete search history.

(56) References Cited

U.S. PATENT DOCUMENTS

| | | | |
|---|---|---|---|
| 5,287,499 A | 2/1994 | Nemes | |
| 5,440,727 A | 8/1995 | Bhide et al. | |
| 5,812,398 A | 9/1998 | Nielsen | |
| 5,813,008 A | 9/1998 | Benson et al. | |
| 6,041,423 A | 3/2000 | Tsukerman | |
| 6,421,687 B1 * | 7/2002 | Klostermann | ........................ 1/1 |
| 6,477,544 B1 | 11/2002 | Bolosky et al. | |
| 6,629,198 B2 | 9/2003 | Howard et al. | |
| 6,678,809 B1 | 1/2004 | Delaney et al. | |

(Continued)

FOREIGN PATENT DOCUMENTS
EP 1 818 847 A2 8/2007

OTHER PUBLICATIONS

Jenkins, Bob, "Hash Functions", Dr. Dobb's Journal, Sep. 1, 1997, available at http//www.ddj.com/architect/184410284 (5 pages).

(Continued)

*Primary Examiner* — Don Wong
*Assistant Examiner* — Thanh-Ha Dang
(74) *Attorney, Agent, or Firm* — Finnegan, Henderson, Farabow, Garrett & Dunner LLP (57) ABSTRACT

In a data storage system having a plurality of storage nodes storing replicas of stripes, one storage node serves as a primary stripe node for a stripe. Client applications using the data storage system request operations affecting metadata stored in the stripe, and the data storage system creates workflow objects to implement the requested operation. Once the operation is completed, the workflow is acknowledged. A method for establishing a new primary stripe node comprises performing, by a selected storage node, a feasibility determination to determine the feasibility of the selected storage node becoming the new primary stripe node. It is feasible to become a new primary stripe node when doing so does not cause workflows that have been acknowledged, or that will be acknowledged, to result in strays.

37 Claims, 6 Drawing Sheets

U.S. PATENT DOCUMENTS

| | | | |
|---|---|---|---|
| 6,865,577 B1 | 3/2005 | Sereda | |
| 7,003,551 B2 | 2/2006 | Malik | |
| 7,047,358 B2* | 5/2006 | Lee et al. | 711/114 |
| 7,093,137 B1 | 8/2006 | Sato et al. | |
| 7,165,082 B1 | 1/2007 | DeVos | |
| 7,197,599 B2 | 3/2007 | Corrado | |
| 7,254,596 B2 | 8/2007 | De Spiegeleer | |
| 7,379,549 B2 | 5/2008 | Pelly et al. | |
| 7,424,637 B1 | 9/2008 | Schoenthal et al. | |
| 7,657,578 B1* | 2/2010 | Karr et al. | 707/610 |
| 7,716,060 B2 | 5/2010 | Germeraad et al. | |
| 2003/0028783 A1 | 2/2003 | Collins et al. | |
| 2003/0120864 A1 | 6/2003 | Lee et al. | |
| 2003/0145167 A1 | 7/2003 | Tomita | |
| 2003/0188153 A1 | 10/2003 | Demoff et al. | |
| 2004/0024739 A1 | 2/2004 | Copperman et al. | |
| 2004/0049700 A1 | 3/2004 | Yoshida | |
| 2004/0111557 A1 | 6/2004 | Nakatani et al. | |
| 2005/0015416 A1 | 1/2005 | Yamagami | |
| 2005/0033777 A1 | 2/2005 | Moraes et al. | |
| 2005/0114399 A1 | 5/2005 | Hosoi | |
| 2005/0262361 A1 | 11/2005 | Thibadeau | |
| 2006/0031230 A1 | 2/2006 | Kumar | |
| 2006/0106811 A1 | 5/2006 | Blumenau et al. | |
| 2006/0106884 A1 | 5/2006 | Blumenau et al. | |
| 2006/0106898 A1 | 5/2006 | Frondozo et al. | |
| 2006/0136735 A1 | 6/2006 | Plotkin et al. | |
| 2006/0143168 A1 | 6/2006 | Rossmann | |
| 2006/0206662 A1 | 9/2006 | Ludwig et al. | |
| 2006/0224846 A1 | 10/2006 | Amarendran et al. | |
| 2006/0230244 A1 | 10/2006 | Amarendran et al. | |
| 2006/0235908 A1 | 10/2006 | Armangau et al. | |
| 2006/0248055 A1 | 11/2006 | Haslam et al. | |
| 2006/0248273 A1 | 11/2006 | Jernigan, IV et al. | |
| 2006/0265370 A1 | 11/2006 | Qian | |
| 2006/0288161 A1 | 12/2006 | Cavallo | |
| 2007/0110044 A1 | 5/2007 | Barnes et al. | |
| 2007/0112883 A1 | 5/2007 | Asano et al. | |
| 2008/0005194 A1 | 1/2008 | Smolen et al. | |
| 2008/0189498 A1* | 8/2008 | Brown | 711/162 |
| 2008/0243878 A1 | 10/2008 | de Spiegeleer et al. | |
| 2008/0243953 A1 | 10/2008 | Wu et al. | |
| 2008/0263363 A1 | 10/2008 | Jueneman et al. | |
| 2009/0049240 A1* | 2/2009 | Oe et al. | 711/114 |
| 2009/0259669 A1 | 10/2009 | Abbruzzi et al. | |
| 2010/0215175 A1 | 8/2010 | Newson et al. | |
| 2010/0217953 A1 | 8/2010 | Beaman et al. | |

OTHER PUBLICATIONS

Jenkins, Robert J., "Hash Functions for Hash Table Lookup", 1995-1997, http//www.burtleburtle.net/bob/hash/evahash.html (8 pages).

Decandia, Giuseppe et al., Dynamo: Amazon's Highly Available Key-value Store, Amazon.com, SOSP'07, Oct. 14-17, 2007, Stevenson, Washington, pp. 205-220.

Guy, Richard G., Ficus: A Very Large Scale Reliable Distributed File System, Technical Report CSD-910018, Computer Science Department, University of California, Los Angeles, CA, Jun. 3, 1991.

Honicky, R.J. et al., Replication Under Scalable Hashing: A Family of Algorithms for Scalable Decentralized Data Distribution, Proceedings of the 18th International Parallel and Distributed Processing Symposium, Santa Fe, NM, Apr. 2004.

Microsoft IT Showcase, Single Instance Storage in Microsoft Windows Storage Server 2003 R2: A Solution for Managing Duplicate Files, Technical White Paper, May 2006.

Mohan, C. et al., ARIES: A Transaction Recovery Method Supporting Fine-Granularity Locking and Partial Rollbacks Using Write-Ahead Logging, Association for Computing Machinery, ACM Transactions on Database Systems, vol. 17, No. 1, Mar. 1992, pp. 94-162.

Satyanarayanan, M., Coda: A Highly Available File System for a Distributed Workstation Environment, IEEE Transactions on Computers, vol. 39, p. 447-459 (1990), available at http://citeseerx.ist.psu.edu/viewdoc/summary?doi=10.1.1.31.1314.

Weil, Sage A. et al., Ceph: A Scalable, High-Performance Distributed File System, OSDI '06: 7th USENIX Symposium on Operating Systems Design and Implementation, pp. 307-320.

Weil, Sage A. et al., CRUSH: Controlled, Scalable, Decentralized Placement of Replicated Data, IEEE, SC2006, Nov. 2006, Tampa, Florida.

Wikipedia, List of file systems, Nov. 27, 2007, http//en.wikipedia.org/wiki/List_of_file_systems.

Wikipedia, Replication (Computer Science), Nov. 27, 2007, http://en.wikipedia.org/wiki/Replication_%28computer_science%29.

Xin, Qin et al., Evaluation of Distributed Recovery in Large-Scale Storage Systems, Proceedings of the 13th IEEE International Symposium on High Performance Distributed Computing, Honolulu, HI, Jun. 2004.

U.S. Appl. No. 12/100,962 by Abbruzzi et al., filed Apr. 10, 2008: Final Office Action, dated Dec. 23, 2010.

U.S. Appl. No. 12/100,962 by Abbruzzi et al., filed Apr. 10, 2008: Advisory Action, dated Mar. 2, 2011.

U.S. Appl. No. 12/391,099 by Beaman et al., filed Feb. 23, 2009: Non-Final Office Action, dated Jan. 20, 2011.

International Search Report and Written Opinion issued in PCT/US2010/024787; Date of Mailing: May 18, 2010.

Broder, A. et al. "Using Multiple Hash Functions to Improve IP Lookups" IEEE INFOCOM 2001: 20th Annual Joint Conference of the IEEE Computer and Communications Society, Anchorage, Alaska, Apr. 22-26, 2001; Proceedings, vol. 3, pp. 1454-1463.

International Business Machines Corp. (IBM) "Cache Hash Overflow Table for Computers Using Cache Memory" Technical Disclosure Bulletin, vol. 32, No. 3B, pp. 110-117 (Aug. 1, 1989).

International Search Report and Written Opinion issued in International Patent Application No. PCT/US2010/024784; Date of Mailing: Jul. 13, 2010.

Kirsch, A. et al. "On the Performance of Multiple Choice Hash Tables with Moves on Deletes and Inserts" 2008 46th Annual Allerton Conference on Communication, Control, and Computing. Allerton House, UIUC, Illinois, USA, Sep. 23-26, 2008 IEEE; ThD1.4, pp. 1284-1290.

Partial International Search Report, Annex to Invitation to Pay Fees, issued in International Patent Application No. PCT/US2010/024891; Date of Mailing: Jun. 24, 2010.

U.S. Appl. No. 12/100,962 by Abbruzzi et al., filed Apr. 10, 2008: Non-Final Office Action, dated Jul. 7, 2010.

International Search Report and Written Opinion issued in International Patent Application No. PCT/US2010/024889; Date of Mailing: Oct. 22, 2010.

International Search Report and Written Opinion issued in International Patent Application No. PCT/US2010/024891; Date of Mailing: Sep. 22, 2010.

Kumar, S. et al. "Segmented Hash: An Efficient Hash Table Implementation for High Performance Networking Subsystems" Proceedings of the Symposium on Architecture for Networking and Communications Systems (ANCS), Oct. 26-28, 2005, Princeton, New Jersey; pp. 91-103.

Seagate "The Benefits of Self-Encrypting Drives in the Data Center" Technology Paper, Publication No. TP590.1-0804US, Apr. 1, 2008 [online]. Retrieved from the Internet: http://www.lsi.com/campaigns/forms/security_cw/downloads/pdf/TP590.1-0804US_lr.pdf.

Wikipedia "Key derivation function" Dec. 25, 2008 [online]. Retrieved from the Internet: http://en.wikipedia.org/w/index.php?title=Key_derivation_function&oldid=260028157.

* cited by examiner

MANAGING WORKFLOW COMMUNICATION IN A DISTRIBUTED STORAGE SYSTEM

RELATED APPLICATIONS

The present application is a continuation-in-part of U.S. application Ser. No. 12/391,099, entitled "Methods and Systems for Single Instance Storage of Asset Parts," filed Feb. 23, 2009, and claims the benefit of U.S. Provisional Application No. 61/154,743, filed Feb. 23, 2009, both of which are hereby incorporated by reference in their entirety.

BACKGROUND

In distributed data storage systems, it is desirable to distribute the workload for managing and storing data across a large number of nodes, and to provide linear or near-linear scalability. In such systems, a SEDA (Staged Event-Driven Architecture) may be employed and work may be accomplished in such systems by utilizing a workflow object. In distributed data storage systems in which redundancy is implemented to ensure a desired level of reliability, the system should guarantee that work (such as the addition, deletion, or change of data) has been durably committed to disk. One way to guarantee this is to perform the work and then subsequently perform a verification that changes have been durably committed to disk, and, after the verification, send an acknowledgment to the client application that made the work request. Some systems may implement a two-phase commit protocol to accomplish this goal, but those systems may not offer the desired level of scalability.

Further, in distributed and redundant data storage systems, it may be desirable to maintain a history of work transactions that occurred in the data storage system to assist in recovery from non-catastrophic failures.

SUMMARY OF EXEMPLARY EMBODIMENTS

Additional objects and advantages will be set forth in part in the description which follows, and in part will be obvious from the description, or may be learned by practice of the embodiments. The objects and advantages will be realized and attained by means of the elements and combinations particularly pointed out in the appended claims.

Methods and systems are disclosed that relate to determining feasibility of a selected stripe node becoming a new primary stripe node for a stripe in a data storage system, the data storage system comprising a plurality of nodes storing replicas of the stripe. In one embodiment, a method comprises computing a test generation for a journal associated with the selected stripe node and corresponding to the stripe, wherein the journal comprises entries that are assigned generations greater than previous entries. The method next compares, by a feasibility module, a greatest generation corresponding to the stripe for each of the plurality of nodes storing replicas of the stripe with the test generation, and when the greatest generation for each of the plurality of nodes storing replicas of the stripe is less than the test generation, the method determines that it is feasible for the selected stripe node to become the new primary stripe node. The test generation may comprise, for example, a generation that would be assigned to an entry that would be next recorded in the journal or alternatively, the greatest generation assigned to entries in the journal associated with the selected stripe node. Once feasibility is affirmed, in some embodiments, becoming the new primary stripe node comprises writing a first entry in the journal associated with the selected stripe node, the first entry being assigned the test generation.

In another embodiment, when the greatest generation for any of the plurality of nodes storing replicas of the stripe is greater than or equal to the test generation, the method determines that it is not feasible for the selected stripe node to become the new primary stripe node. In some embodiments, the greatest generation corresponding to the stripe for each of the plurality of nodes storing replicas of the stripe is stored in an endorsement repository at the selected stripe node.

In yet another embodiment, a durability policy may be implemented. For example, the plurality of nodes storing replicas of the stripe comprises a subset of the plurality of nodes storing replicas of the stripe, the subset having equivalent greatest generations corresponding to the replicas of the stripe, wherein the subset has a minimum number of replicas of the stripe, and wherein the minimum number is chosen to achieve a desired level of durability. The method may determine that it is feasible for the selected stripe node to become the new primary stripe node when the greatest generation for the nodes in the subset is less than the test generation, and when the greatest generation for any of the plurality of nodes storing replicas of the stripe is greater than or equal to the test generation, the method may determine that it is not feasible for the selected stripe node to become the new primary stripe node.

In yet another embodiment, prior to determining that it is feasible to become the new primary stripe node, each of the plurality of nodes storing replicas of the stripe communicates, to the selected stripe node, a commitment not to endorse generations greater than the test generation for the journal associated with the selected stripe node. Further, in some embodiments, the commitment not to endorse generations greater than the test generation for the journal associated with the selected stripe node comprises a message containing an epoch of a new stripe map.

In still other embodiments, each of the plurality of nodes storing replicas of the stripe stores a stripe map, the stripe map comprising an indication of which of the plurality of nodes storing replicas of the stripe is a primary stripe node, and the method of determining feasibility is triggered by receiving a new stripe map at the selected stripe node, wherein the new stripe map indicates that the selected stripe node is intended to become the new primary stripe node.

In some embodiments, prior to determining that it is feasible to become the new primary stripe node, each of the plurality of nodes storing replicas of the stripe communicates, to the selected stripe node, a commitment not to endorse generations greater than the test generation for the journal associated with the selected stripe node and corresponding to the stripe, wherein the new stripe map is associated with an epoch that is greater than any epoch for previous stripe maps, and wherein the commitment not to endorse generations greater than the test generation for the journal associated with the selected stripe node and corresponding to the stripe comprises a message containing the epoch of the new stripe map.

One of ordinary skill in the art will appreciate that the methods described herein may be embodied in various components of a computer system with at least one associated data storage subsystem. Additional embodiments consistent with principles of the invention are set forth in the detailed description which follows or may be learned by practice of methods or use of systems or articles of manufacture disclosed herein. It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this disclosure, illustrate several embodiments of the invention and together with the description, serve to explain the principles of the invention. In the drawings.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts. While several exemplary embodiments are described herein, modifications, adaptations, and other implementations are possible without departing from the spirit and scope of the invention. For example, substitutions, additions, or modifications may be made to the components illustrated in the drawings, and the exemplary methods described herein may be modified by substituting, reordering, or adding steps to the disclosed methods. Accordingly, the following detailed description does not limit the invention. Instead the proper scope of the invention is defined by the appended claims.

Within the concept of this specification, a "data storage system" broadly refers to any data storage devices or memories such as hard disk drives, databases, or enterprise storage systems. A data storage system further includes any processors, programs, and applications accessing and/or managing the data storage devices or memories as well as communication links between the data storage devices or memories, and communication links between the processors, programs, and applications and the data storage devices or memories.

Figure 1:
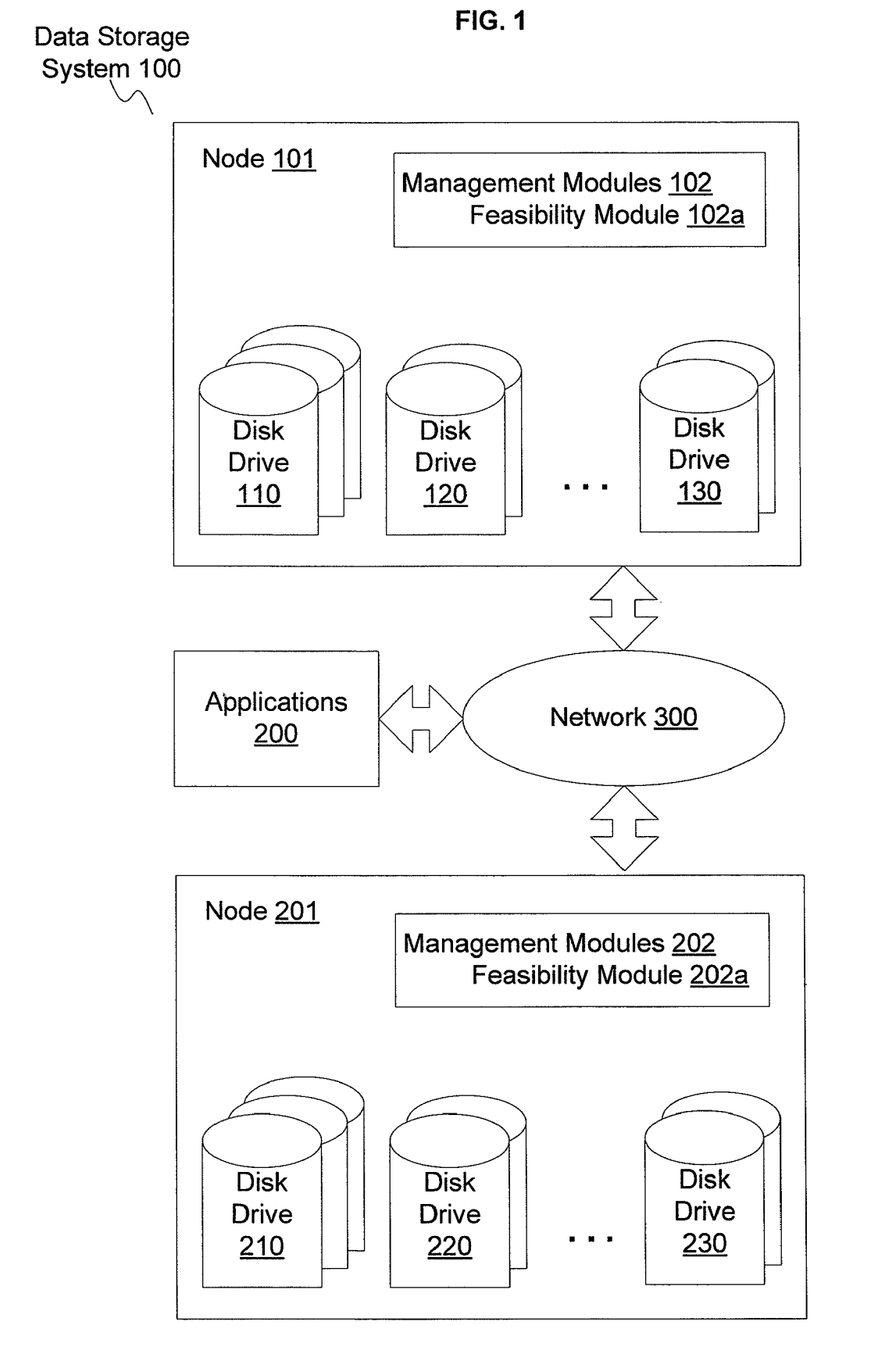
FIG. 1 illustrates an exemplary data storage system consistent with features and principles of the present invention.

FIG. 1 shows a data storage system 100 having a node 101 and a node 201. As used herein, a "node" refers to a subset of a data storage system having at least one associated disk drive. An example of a node is a server having one or more hard disk drives for storing data. The nodes in a data storage system may be in different geographical locations.

As used herein, a "disk drive" refers to any persistent memory accessible by a node, such as an internal or external hard drive. A disk drive may be a RAID drive made up of one or more physical storage devices. For simplicity, only three disk drives are shown in nodes 101 and 201 of data storage system 100. Disk drives 110, 120, and 130 are associated with node 101 and disk drives 210, 220, and 230 are associated with node 201. Although only a few nodes and disk drives are shown throughout the figures for simplicity, embodiments of the present invention can have any number of nodes and any number of disk drives.

Network 300 provides communications between various entities in data storage system 100, such as node 101, node 201, and applications 200. Network 300 may be a shared, public, or private network, may encompass a wide area or local area, and may be implemented through any suitable combination of wired and/or wireless communication networks. Furthermore, network 300 may comprise an intranet or the Internet. Applications 200 are any programs communicating with nodes 101 and 201, such as those retrieving data from the disk drives at the nodes. An exemplary application is a search engine, whereby a user can search for particular data stored in the data storage system 100.

Each node has management modules which include one or more processors, memory, and hardware, software, or firmware used to store and execute instructions to manage the data stored on the disk drives of that node. For example, management modules 102 implement algorithms for managing the data stored in disk drives 110, 120 and 130. The methods disclosed herein may be implemented by one or more of the management modules 102, 202, and additional management modules not depicted for simplicity. Management modules 102 and 202 may have sub-modules, such as feasibility modules 102a and 202a shown in FIG. 1. Alternatively, feasibility modules 102a and 202a may not be distinct from other management modules comprising management modules 102 and 202. Further, feasibility modules 102a and 202a may also comprise sub-modules. In alternative embodiments, the methods disclosed herein may be implemented by management modules external to the nodes, or by a combination of management modules internal to the nodes, such as management modules 102 and 202, and management modules external to the nodes communicating with the nodes via network 300. Further, in alternative embodiments, memory used by the management modules and instructions implemented by the management modules may be stored in a location on the data storage system external to the management modules themselves.

An "asset," as used herein, refers to one or more units of data. A single asset may correspond to data comprising what an end user application would consider to be a single file, such as a MICROSOFT Office Word™ document, or an email. Assets contain application metadata and one or more asset parts. The application metadata may contain the elements that an application applies in the process of managing the asset, such as annotations or retention data.

Asset parts are portions of assets. In an illustrative embodiment, an asset part contains only immutable data, such as an archival copy of a document, but in other embodiments, asset parts may contain changeable data. Typically, the end user application performs the decomposition of an asset into its asset parts. In some embodiments, additional decomposition may be performed by the data storage system, or the decomposition into asset parts by an application may be replaced by the decomposition performed by the data storage system. In other embodiments, decomposition may be performed solely by the data storage system.

Figure 2:
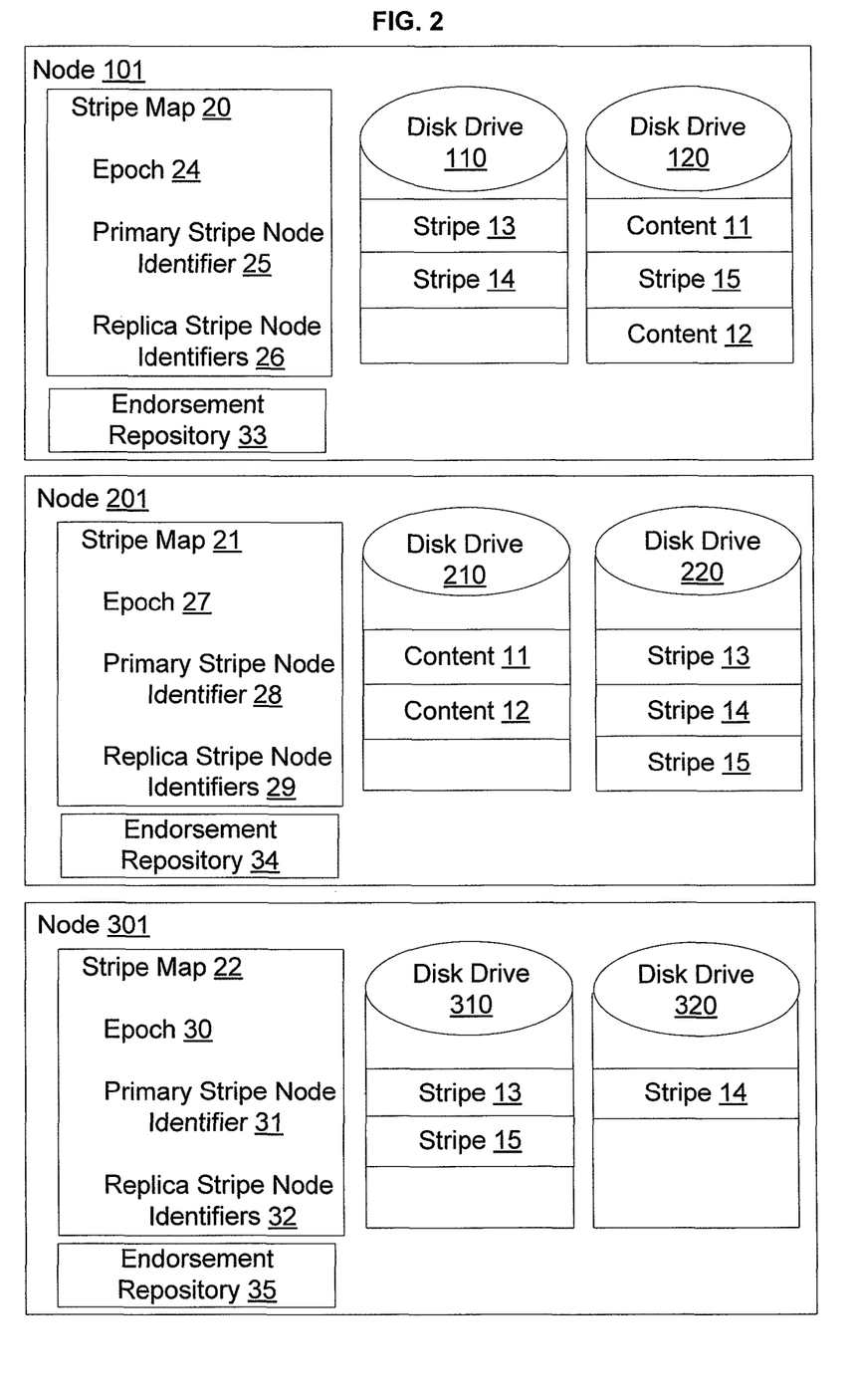
FIG. 2 illustrates exemplary nodes in the data storage system of FIG. 1 configured for redundant storage of data and metadata, consistent with features and principles of the present invention.

FIG. 2 shows exemplary content 11 and content 12, which represent the content of various assets and asset parts that were ingested into data storage system 100. Content 11 and 12 are replicated across two nodes, node 101 and node 201, so that there are two instances of each asset and asset part contained within content 11 and content 12. As noted above, the number of replicas should be chosen to achieve the desired level of redundancy, and in one illustrative embodiment, four replicas of content 11 and content 12 may be stored in data storage system 100. Generally, it is desirable to ensure that the replicas of content 11 and content 12 are distributed across multiple nodes, such that two replicas do not reside on the same node. Furthermore, content corresponding to asset parts that make up a particular asset may be stored on different nodes in the data storage system. For example, the content for a particular asset part may be stored on disk drive 120, the content for that same asset part may be stored on disk drive 210.

In addition to storing asset and asset part content, data storage system 100 stores metadata associated with the assets and asset parts. This metadata is stored in stripes (or shards), which comprise metadata for a group of assets and/or asset parts. A stripe (or shard) is a grouping of data and/or metadata, formed from one or more logical partitions of data storage. The stripe that stores a particular object (data or metadata) should be computed in a deterministic manner, for example, by using an algorithm that chooses a stripe based on a unique identifier associated with the object. In this way, knowing the unique identifier of the object, data storage system 100 can determine which stripe contains the particular object.

FIG. 2 shows exemplary stripes 13, 14, and 15. The data storage system 100 stores replicas of stripes 13, 14, and 15, which are replicated across the plurality of nodes. FIG. 2 shows three replicas of exemplary stripes 13, 14, and 15 distributed across nodes 101, 201 and 301. The number of stripe replicas should also be chosen to achieve a desired level of redundancy, and in one embodiment, four replicas may be stored. In one illustrative embodiment, algorithms ensure that the content for an asset or asset part is stored on a separate disk drive than the metadata associated with the asset or asset part. For example, in such a system, if content 12 has the content of a particular asset part, and stripe 13 contains storage metadata associated with that particular asset part, then content 12 and stripe 13 would not be stored on the same disk drive. For example, FIG. 2 shows content 12 stored on disk drive 120 and disk drive 210, while stripe 13 is stored on disk drives 110, 220, and 310. Further, algorithms may ensure that content 12 and stripe 13 are always stored on separate nodes (not shown in FIG. 2). In alternative embodiments, content for an asset or asset part may reside on the same disk drive as the stripe containing storage metadata about that asset or asset part.

Each disk drive may contain a combination of stripes and content. For example, disk drive 120 contains content 11, content 12, and stripe 15. In alternative embodiments, each disk drive may be permitted to contain only content or only stripes. For example, in FIG. 2, node 201 has two disk drives 210 and 220, and disk drive 210 contains only content (content 11 and content 12) while disk drive 220 contains only stripes (stripes 13, 14, and 15). In other embodiments, all disk drives on a node may contain only content or only stripes. In one illustrative embodiment, data storage system 100 contains 256 stripes.

Figure 3:
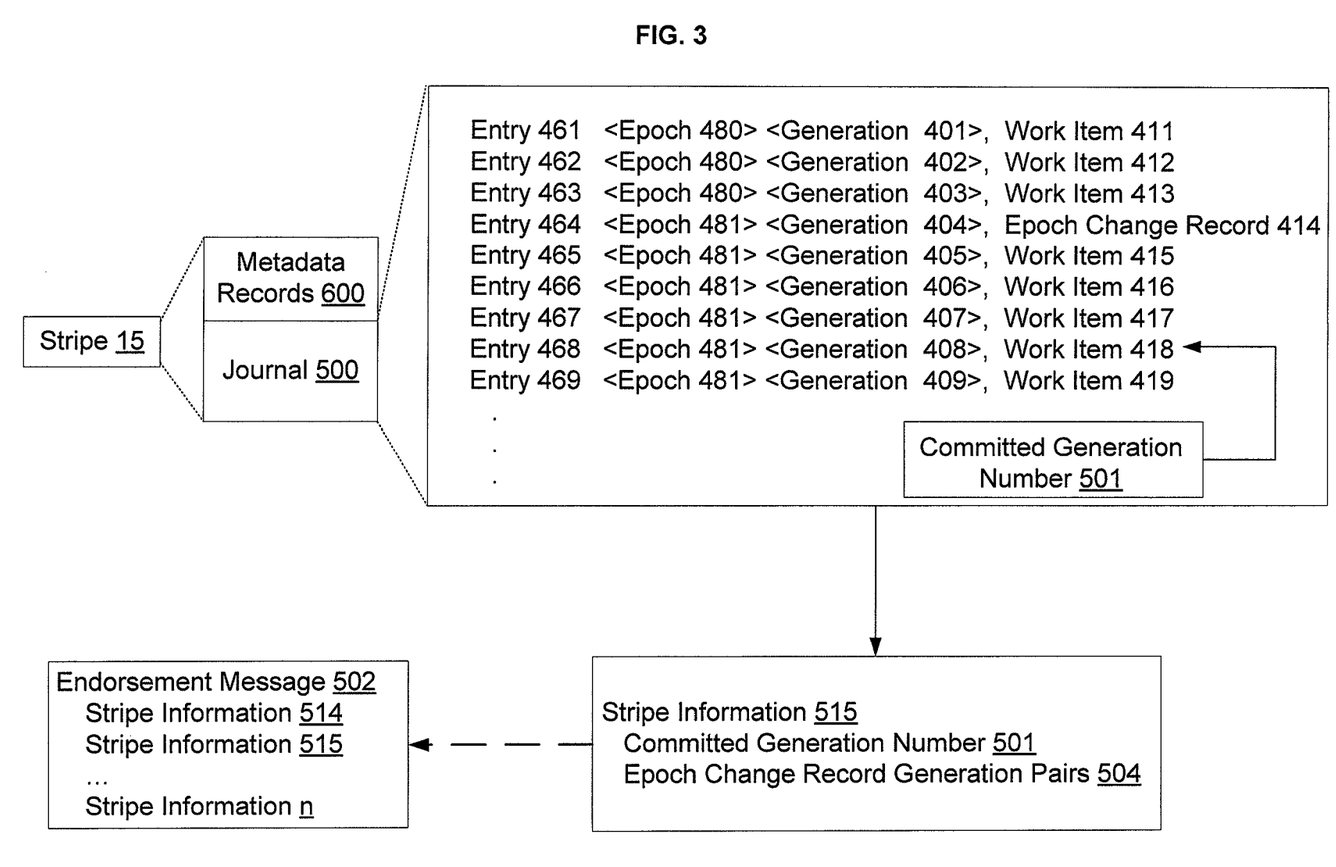
FIG. 3 illustrates an exemplary stripe and stripe journal in the exemplary data storage system of FIG. 1, consistent with features and principles of the present invention.

Stripes contain both asset part metadata and a journal for maintaining information regarding work to be performed on the assets and/or asset parts associated with the stripe. In one illustrative embodiment, all actions to be performed on assets and asset parts associated with the stripe 15 correspond to an entry in the journal 500. The journal entries represent an intention by the data storage system 100 to perform some action (such entries comprise instructions to update metadata associated with an asset or asset part, and herein, journal entries are also described as updates), or a record of having performed some action. FIG. 3 illustrates an exemplary journal 500 in detail. The syntax used in the exemplary journal 500 is for explanatory purposes only, and the syntax used in a journal consistent with the principles of the present invention could comprise any syntax that the management modules of the data storage system could understand and implement.

Each entry in the journal is associated with a generation to uniquely identify the entry. The generation is implemented such that the sequence of the entries is preserved. For example, if entry 462 occurs after entry 461, the generation associated with entry 462, generation 402, is greater (or larger or higher) than the generation associated with entry 461, generation 401. For example, the generation may comprise either an incrementing number or a byte-offset from the beginning memory address of the journal entries. In one embodiment, the generation is a unique 64-bit address that increases monotonically for the next entry to be added to the journal. Alternatively, the journal entries may be associated with a timestamp in lieu of, or in addition to, the generation.

For each stripe, one node serves as the primary stripe node, and the other nodes containing replicated copies of the stripe are replica stripe nodes. The primary stripe node for a particular stripe is the only node permitted to add new entries to the journal for that stripe. Other nodes serving as replica stripe nodes receive, store, and apply copies of the newly added entries, but a new journal entry is permitted to originate only on the primary stripe node. The data storage system replicates journal entries to the replica stripe nodes, and each replica stripe node applies the updates indicated by the replicated journal entries into its redundant copy of the stripe. The replication of journal entries may be done asynchronously and is explained in more detail below.

In stable operation all nodes have identical copies of a stripe map that indicates which node serves as the primary stripe node for each stripe (a "stripe map"). The stripe map also contains the identity of the replica stripe nodes responsible for keeping copies of the stripe. FIG. 2 shows nodes 101, 201 and 301 having stripe maps 20, 21, and 22 respectively. Stripe map 20, for example, contains a primary stripe node identifier 25 and replica stripe node identifiers 26 for every stripe in the data storage system 100. If node 101 is the primary stripe node for stripe 13, then a primary stripe node identifier 25 that identifies node 101 is included in stripe map 20. Further, replica stripe node identifiers 26 identify nodes 201 and 301, which have replicas of stripe 13. As explained below, the stripe map allows any node to direct workflow objects to the correct node for each work item in a workflow object.

During operation of data storage system 100, a node may fail, may be purposefully taken offline, or may otherwise be unable to communicate with portions of data storage system 100. In this case, stripe maps 20, 21, and 22 may not be identical because a new stripe map may have been deployed, but not received, by one of the nodes. The systems and methods disclosed herein are designed to accommodate such events and are designed to ensure that workflow objects are properly handled in data storage system 100.

Workflow Objects

Data storage system 100 is designed to distribute workload and storage across a large number of nodes while providing linear or near-linear scalability. To accomplish this in-part, data storage system 100 works under the SEDA (Staged Event-Driven Architecture) paradigm. Each unit of work, such as the ingestion of a new asset, is conveyed by means of a workflow object that passes from node to node to perform the work items (i.e. the individual steps required to perform the unit of work), where the work items are also known as operations. Other examples of operations include retrieval of an asset or destruction of an asset. The workflow object may contain an identification of the operation type as well as information to correlate the request for an operation with the workflow object. For example, the workflow object may contain an identifier of the application that initiated an action requiring the operations associated with the workflow object.

In addition, the workflow object may contain payload objects that are needed to carry out the operation. For example, if the operation associated with the workflow object is to retrieve an asset, the workflow object may contain a unique identifier of the asset. For ingestion of an asset having asset parts, the related workflow object does not necessarily contain the content bytes of the asset or its asset parts. Instead the asset and asset parts may be represented in the workflow object as DataSource objects, which reference the actual content stored on the data storage system or elsewhere such as on an external network. In one embodiment, the actual content may remain in the client application. When a node participating in the execution of a workflow object needs to write the content of an asset part to disk it may use the DataSource object to read the content bytes from its location. This structure allows the client application to deliver the bytes directly to the node that is making the first copy of those bytes to a disk drive in data storage system 100.

A workflow object may also contain information relating to the partial results of the operation. This information would be updated during the processing of the workflow object. For example, if the operation associated with the workflow object is to ingest an asset, the workflow object may contain, for each asset part making up the asset, an indicator of the progress of ingesting the particular asset part.

A selected workflow object is present on only one node at a time. That node performs whatever work can be done locally to make progress in performing a work item for the operation (by making copies of some asset parts, for example), and then passes the workflow object on to another node that has additional responsibility for completing another work item in the workflow object. Data storage system 100 may require that work items necessitating changes to a stripe are first completed on the primary stripe node. A work item may be completed, for example, by writing entries in the appropriate primary stripe node's stripe journal. Other work items may be completed, for example, by writing content bytes to disk.

To determine which node is the primary stripe node, a node consults its stripe map, which indicates, for each stripe in the data storage system, which node is the primary stripe node. After all work items are completed, the workflow object may be passed to other management modules of data storage system 100 for further processing or to make a record of having performed the operation. For one example, the workflow object may be passed to a search indexing subsystem of the data storage system.

Once a node's work items are complete, it passes the workflow object on to another node and removes all local knowledge of workflow object. The existence of a workflow object or the lack of completion of the operation associated with the workflow object does not require a node to maintain an internal state pending fulfillment of another work item or operation by any other machine. Assuming relatively even distribution of workflow objects across all the nodes, this means that each node can simply process work at its own maximum capacity without waiting for other nodes. This property results in linear scalability. As a side effect, data storage system 100 may lose in-progress workflow objects when hardware fails. Such failures may be detected and handled by the application software utilizing data storage system 100. For example, such failures may be handled by standard error handling code associated with the application.

Data storage system 100 does not use distributed transactions in workflow object processing. To do so would violate the concept that a workflow object leaves no state behind when it leaves a node, and would result in loss of scalability. Therefore every operation in data storage system 100 is designed to execute correctly in the event a workflow object is lost due to failure and to provide sufficient data consistency during concurrent processing of multiple workflow objects. Further, each work item of every workflow object is designed to impact only one node. The methods and systems presented herein are designed to accomplish this goal.

Data storage system 100 sends workflow acknowledgments back to the client application after it has successfully completed the requested action (i.e. once the workflow object has visited all of the nodes necessary to perform the operations and each work item making up the requested action has been executed to the desired level of reliability). For example, data storage system 100 sends an acknowledgment that an asset and its asset parts have been successfully archived after it has made a sufficient number of redundant copies to ensure that there is a sufficiently low probability of data loss in the event that disk drives or entire nodes fail.

Data storage system 100 creates the workflow object when an application requests data storage system 100 to perform some operation. Management modules within the data storage system 100 may also request an operation, causing a workflow object to be created. For example, data storage system 100 may require the redistribution of assets and/or asset parts due to the addition or removal of a disk drive and may initiate requests for related operations to accomplish the redistribution. The requested operation may be made up of multiple individual operations, and may result in the creation of multiple workflow objects (one for each individual operation). An individual operation may comprise, for example, ingestion of an asset and its asset parts, relocation of an asset or asset parts, destruction of an asset or asset part, modification of an asset or asset parts, or retrieval of an asset or asset part.

The request for an action may be received at any node on data storage system 100. For example, the request may be received by node 101. When a request is received, a workflow object or objects may be created to accomplish the operations required by the request. If node 101 is able to perform a work item in the workflow object, it performs the work. For example, if node 101 is the primary stripe node for a stripe associated with a work item in the workflow object, it performs the work items in the workflow object relating to that stripe. If node 101 is not implicated by any work item in the workflow object, node 101 forwards the workflow object to another node implicated by a work item in the workflow object. In one illustrative example, if the operation is to ingest an asset A having asset parts P1, P2, and P3, and node 101 is not the primary stripe node for P1, P2, or P3, then node 101 forwards the workflow object to one of the primary stripe nodes for P1, P2, or P3.

The selection of a node to forward the workflow object may, in some embodiments, be based on geographical proximity. For example, data storage system 100 may be configured to select a node at the same geographic location before sending the workflow object to a node at a different geographic location. Further, data storage system 100 may be configured to select a node on the same local area network before selecting a node that requires the workflow object to be sent across a wide area network. Such a mechanism attempts to minimize the number of high-latency hops for the workflow object, as well as the number of bytes transmitted over longer distances or over more complex protocols.

At a primary stripe node, all work items associated with that stripe and associated with the operation invoked by the workflow object are written as entries in the primary stripe node's stripe journal for that stripe. If necessary, the primary stripe node also makes modifications to the metadata records, hashtable file, and modifies, creates or destroys copies of content. In some embodiments, the workflow object may be sent to all replica stripe nodes (those nodes containing replicas of the content or stripe implicated by a work item.) At the replica stripe nodes, the same work item would be performed as was performed at the primary stripe node. In other embodiments, every work item is associated with an entry on the primary stripe's journal. The entries from the primary stripe node's stripe journal, written as a result of the workflow object having visited the primary stripe node, are replicated to the stripe journals at the replica stripe nodes. The replica stripe nodes then execute the entries in their respective journals.

Each work item may require several steps. For example, if a new asset part must be added to data storage system 100 due to the ingestion of a new asset, and the asset part's metadata is to be associated with stripe 15, the steps might include: creating an asset part record in the metadata records 600 associated with stripe 15, marking a status associated with the new asset as "PENDING", making replicas of the new asset content and new asset part content with the appropriate level of redundancy, then marking the status associated with the new asset as "VALID." These steps may require that the workflow object be passed from node to node. At each node, whatever next step is required for a particular work item is attempted. That node, for example, might have disk drives on which primary stripes for some work items and content volumes for other work items are located. To the extent possible, the data storage system 100 completes one or more steps in each work item before the workflow is passed to the next node. In some embodiments, the writing of an asset or asset part's content bytes does not involve any modifications to journal files. Further, in some embodiments, an asset part's content and the stripe containing its metadata may be located at different nodes. Therefore, the process of writing the content bytes of an asset part to a disk drive may be performed at a node other than the primary stripe node that includes the asset part's metadata.

Journal entries in the primary stripe node's stripe journal may be replicated in a batch process to the replica stripe node's stripe journals. In one embodiment, the node containing a replica stripe node's stripe journal may request a copy of entries with generations greater than the last entry in the replica stripe node's stripe journal. In some embodiments, this may be performed periodically. In other embodiments, a primary stripe node may consult its endorsement repository, explained in further detail below, to determine which nodes may require updates to their stripe journals. The nodes may be configured to limit the size of the transmissions to the replica stripe nodes so that if there is a large number of journal entries that should be sent from the primary stripe node to the replica stripe node, multiple transmissions are possible.

The process of forwarding the workflow object to other nodes implicated by work items in the workflow object is repeated until all of the work items for the operations making up the requested action have been completed. For each work item, when an entry corresponding to a work item is written to a primary stripe node's stripe journal, the generation of the entry into the primary stripe node's stripe journal is recorded in the workflow object so that the workflow object contains a record of the greatest generation for each of the work items.

When the workflow object reaches the final primary stripe node to record the last set of work items into their associated stripe node journals (or to otherwise complete the work items), the final node compares the greatest generation for a work item (work item generation) in the workflow object with a generation of endorsements (endorsement generation) that are recorded in an endorsement repository at the final node. The endorsement process, with which endorsements are sent from and by nodes having replicas of the stripe journal, is explained more fully below. For each work item from the workflow object that is being recorded into the primary stripe node's stripe journal, the final node compares the work item generation with the endorsement generation for the nodes containing the primary stripe and its replica stripes. When the set of nodes with an endorsement generation equal to or greater than the work item generation satisfies a minimum durability policy, described in greater detail below, that work item is "endorsed." When every work item in the workflow object is "endorsed," the workflow object is "released," and the data storage system sends an acknowledgement to the application that made the request indicating that the requested action has completed.

The acknowledgement need not be sent immediately to the application, and some delay or other processes in the data storage system 100 may be required to occur before the acknowledgement is sent. For example, data storage system 100 may include modules that create and maintain a search index of all assets and/or asset parts stored on data storage system 100. An acknowledgement may be delayed until data storage system 100 updates the search index as necessary. If the workflow object was related to a request to add an asset to data storage system 100, for example, data storage system 100 may further delay the acknowledgement of this request until the search index is updated to reflect the addition of the asset and its associated asset parts.

Minimum Durability Policy

Data storage system 100 implements a policy referred to herein as the "minimum durability policy" (or MDP) that establishes how many copies, and in a geographically distributed network where those copies must be located, to assure adequate redundancy. For example, a minimum durability policy might be specified to require storing at least three copies of the asset and each of its asset parts, and to require that at least one of the copies is geographically distant from the others. Data storage system 100 may be configured to allow easy implementation of different minimum durability policies in different segments of data storage system 100 so that different customers and classes of assets can be handled differently depending on their requirements. The minimum durability policy may be implemented on the stripe level, such that different stripes have a different minimum durability policy.

Endorsement Process

Endorsements are broadcast messages sent periodically by each node to all other nodes in data storage system 100. Each node implements a periodic commitment cycle to commit all updates to disk, causing any modified journal entries contained in the main memory cache to be written to the physical hard drive. The node may then update a committed generation, such as committed generation number 501 in FIG. 3 to reflect the generation corresponding to the last journal entry committed to disk during the previous cycle. In the exemplary embodiment of FIG. 3, during a commitment cycle, the last committed generation was generation 408, and committed generation number 501 would contain information identifying generation 408.

Upon completing a commitment cycle, a node broadcasts an endorsement message containing the highest committed generation for each stripe journal on the node. For example, FIG. 3 shows endorsement message 502 containing stripe information 514, stripe information 515, . . . stripe information n, for each of the stripes on the node. If endorsement message 502 is sent from node 101 in FIG. 2, for example, endorsement message 502 would contain the stripe information for stripes 13, 14, and 15. The stripe information for each stripe contains the committed generation for that stripe.

The endorsement messages are received by each node in data storage system 100 and added to an endorsement repository maintained on each node. FIG. 2 depicts endorsement repositories 33, 34, and 35 on nodes 101, 201 and 301 respectively. Endorsement repository 33 contains all endorsements broadcast from nodes 201 and 301 and received by node 101. The algorithm does not depend on the reliability of broadcast messages and will function correctly even if some messages fail to be delivered due to packet loss. All that is required for normal operation is for every node to receive some recent endorsement message from the other nodes within a reasonable length of time.

Primary Stripe Node Preemption

When a node serving as the primary stripe node for some stripe fails, data storage system 100 is configured to choose another node to take over the role of primary stripe node. As a consequence of the failure of the node, some workflow objects in progress at the failed node, and therefore known only to the failed node, may be lost. In addition, as a consequence of the selection of the new primary stripe node, some journal entries that were recently added to the former primary stripe node's stripe journal, but that had not yet been replicated to a replica stripe node's stripe journal, are also lost. Identifying and addressing such losses of information contained in pending workflow objects that have not yet been acknowledged are a normal characteristic of data storage system 100 and are handled by the application layer. For example, a timeout may be implemented in the application such that if an acknowledgement is not received in a certain time period, the request for an operation may be sent again and a new workflow object would be created as a result. However, once data storage system 100 sends an acknowledgment back to the application indicating successful completion of an operation (also thus indicating completion of all work items in the workflow object corresponding to the operation), data storage system 100 must ensure that the acknowledged operation is durable, meaning that the appropriate number of data copies exist and that it is unlikely (within acceptable limits) that a non-catastrophic failure will cause data loss.

When a node fails, part of the process for selecting and implementing a new primary stripe node is that the stripe map is reconfigured to select, for any stripe for which the failing node served as the primary stripe node, another node that will take over as the new primary stripe node. The selected node may be a new node added to the system, or it may be a node previously serving as a replica stripe node and already containing a replica of the stripe. The reconfigured stripe map is then distributed and deployed on each of the remaining nodes. This process is complicated by the possibility that the purportedly failing node may not have failed at all, but may simply be unable to communicate with a subset of the other nodes. The following is an outline of the algorithm by which data storage system 100 maintains a consistency across such failures in such a way to prevent loss of a workflow object that has been acknowledged.

Figure 4:
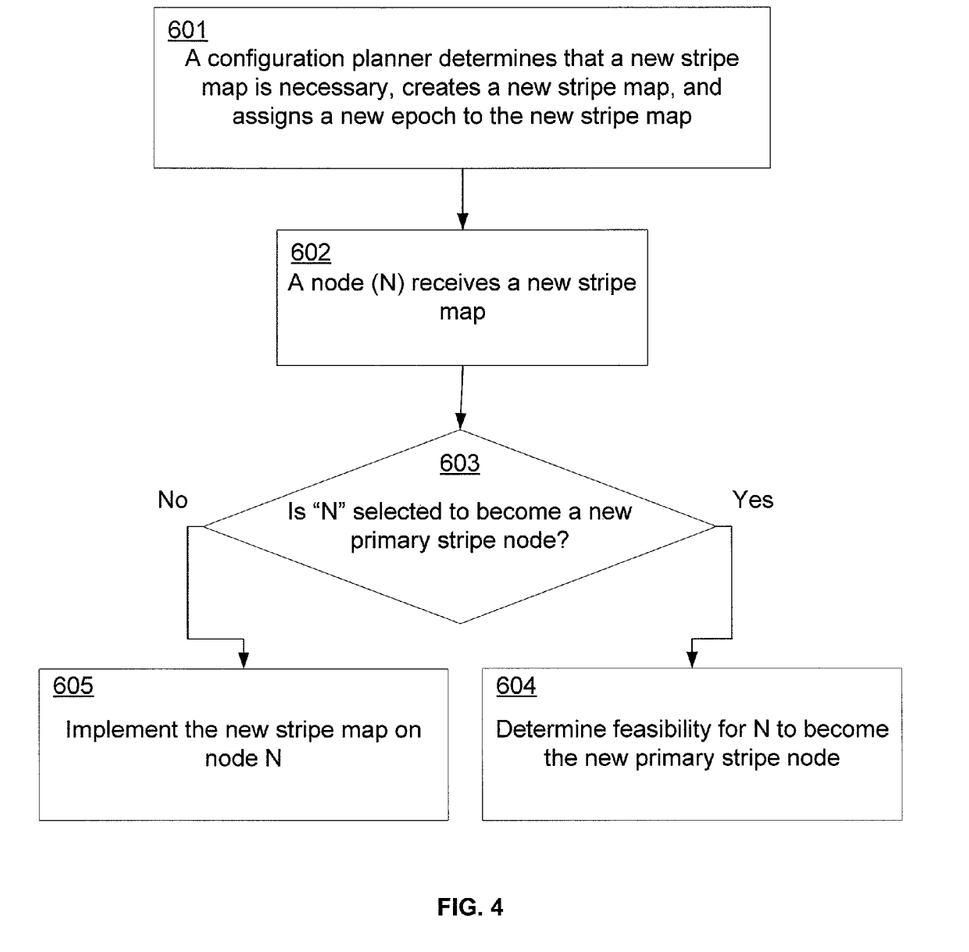
FIG. 4 illustrates an exemplary method for changing the stripe configuration of the exemplary data storage system in FIG. 1, consistent with features and principles of the present invention.

FIG. 4 shows an exemplary method for maintaining consistency. In stage 601, for example, a configuration planner determines that a change to the stripe map is necessary. Such a determination may occur when there has been a change to the structure of the data storage system (i.e. when a disk drive or node has failed, been moved, or been removed from the data storage system). The configuration planner may use a variant of the known Paxos Algorithm to establish durable consensus on the content of a new stripe map. The Paxos Algorithm is a known algorithm used in distributed computer systems having multiple nodes to achieve consensus for a particular action. By using the Paxos algorithm, each of the nodes in data storage system 100 becomes aware of the new stripe map, its contents, and its epoch.

Each new stripe map is assigned a monotonically increasing integer value called its epoch. FIG. 2 shows, for example, epoch 24, epoch 27 and epoch 30 associated with stripe maps 20, 21, and 22 respectively. In an alternative embodiment, the configuration planner may send a broadcast message having the new stripe map information to all of the nodes.

The new stripe map may specify, as a potential new primary stripe node, a selected primary stripe node that is not currently the primary stripe node. In one embodiment, one of the replica stripe nodes may be specified as the new primary stripe node. Alternatively, a new node to which the stripe must be replicated may be selected as the primary stripe node.

Data storage system 100 may send the new stripe map to all of the nodes at the same time, or asynchronously. In one illustrative embodiment, upon recognition that it has been elected the new primary stripe node, the selected stripe node performs a feasibility test to determine if it should become the new primary stripe node. For example, in the illustrative embodiment of FIG. 4, in stage 602, a node (N) receives a new stripe map, and in stage 603 determines whether it is selected to become a new primary stripe node. If it has been selected, N determines the feasibility of becoming the new primary stripe node in stage 604, which is shown in greater detail in FIG. 5. If it has not been selected, N implements the new stripe map.

If the promotion of the selected stripe node to primary stripe node is feasible, the replica stripe node may "preempt the stripe journal" by writing an "epoch change record" to its journal for that stripe. For example, FIG. 3 shows an epoch change record 414 in journal 500 for stripe 15. Entry 464 is the first journal entry in epoch 481 in FIG. 3.

If becoming the new primary stripe node is not feasible, the configuration planner may repeat the process, attempting to select another node as the new primary stripe node. The configuration planner determines that a configuration (or stripe map) it had proposed is not feasible when no endorsements containing the proposed new epoch are received at any of the nodes. Alternatively, the selected node may communicate the lack of feasibility to the configuration planner.

The epoch value of the new stripe map is encoded into the journal, either separately, or encoded into the generation of the journal entry such that if epoch e2 is greater than epoch e1, then any Generation created in epoch e2 is greater than the highest possible Generation created in epoch e1. In some embodiments, a new journal file may be created for each new epoch. In such embodiments, the epoch change record may be written as the first generation in the new epoch. In other embodiments, such as in FIG. 3, both a generation and an epoch are associated with each journal entry. For example, in FIG. 3, entry 461 is associated with epoch 480 and generation 401, while entry 465 is associated with epoch 481 and generation 405.

In addition to the current committed generation of the stripe, each endorsement message also conveys the generations in the previous epochs at which the stripe journal was preempted. This information could comprise at least one generation pair {x,y}, where "x" is the first generation in a given epoch, and "y" is the last generation in that epoch. For example, FIG. 3 shows stripe information 515 for stripe 15 containing both committed generation number 501 and epoch change record generation pairs 504. As explained below, one node may issue a broadcast message to the other nodes in the data storage system not to add further entries to a particular stripe journal in a certain epoch (to "pin" the stripe). Thus, "y" may constitute the last generation in the stripe journal before receiving such a broadcast message from another node. Effectively the endorsement message contains a list of pairs of generation values, {(e1_start, e1_end), (e2_start, e2_end), ... }. This list denotes the surviving history of the stripe journal.

Because all communications take time and happen asynchronously, there may be a period of time when some former primary stripe node is not aware of the new epoch (i.e. the former primary stripe node is not aware of a new stripe map in which it is no longer the primary stripe node for a given stripe) and therefore continues to behave as if it is still the primary stripe node. For example, in the case of a network partition, the former primary stripe node may not be able to communicate with nodes on data storage system 100 that have created consensus to deploy a new stripe map and to select a new primary stripe node. Such a former primary stripe node may attempt to add new journal entries having the previous epoch. Such attempts will result in "strays," comprising journal entries that are not associated with the new primary stripe node's stripe journal and therefore will not result in completion of the associated work item. A stray can be detected because its generation falls outside the range of endorsed journal entries on the new primary stripe node (i.e. the generation and/or the epoch may be smaller than (i.e. less than or lower than) the endorsed journal entries on the new primary stripe node). As a corollary, a stray may occur on a node that has not participated in the feasibility determination with the new primary, which is described below in detail.

In some embodiments, if a node in epoch e1 receives notification of a new stripe map for an epoch e2, which is greater than e1, then the selected stripe node identified in the stripe map having epoch e2 may "pin" its generations before performing a feasibility determination, which is described below. When the node "pins" itself, it does not accept any updates having generations greater than its current generation.

Feasibility Determination

It is feasible for a selected stripe node "N" to become the new primary stripe node for a particular stripe "S" and to endorse the history of epochs {(e1_start, e1_last), (e2_start, e2_last), ... (eN_start, eN_last)} if and only if doing so causes no updates belonging to workflow objects that have been acknowledged (or could ever be acknowledged) to become strays. The following is an example of how a selected stripe node may determine feasibility of becoming the primary stripe node for stripe S. Consider a selected stripe node that intends to become the new primary stripe node for stripe S at epoch "E" by "preempting the stripe journal corresponding to stripe S at generation "G." G is the "test generation" (or presumptive generation) that the selected stripe node uses to make its feasibility determination.

Figure 5:
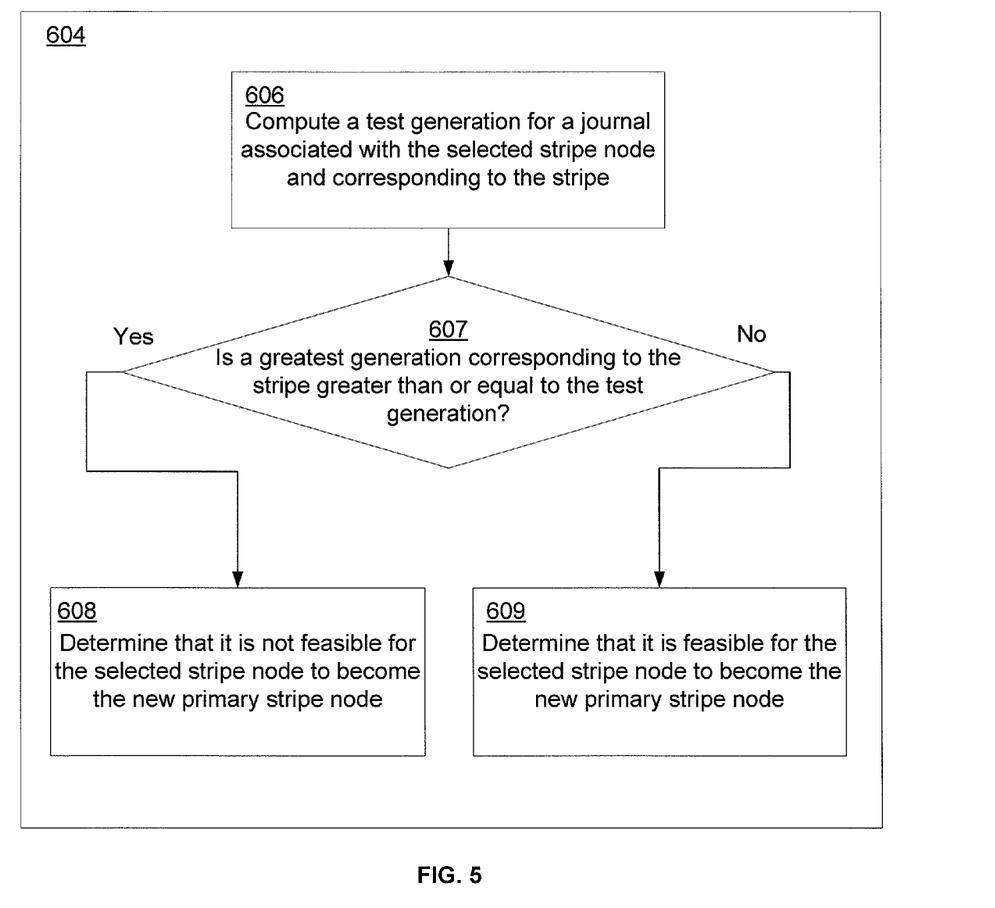
FIG. 5 illustrates an exemplary method for determining whether it is feasible for a selected stripe node to become a new primary stripe node, consistent with features and principles of the present invention.

FIG. 5 shows an exemplary method for whether it is feasible for a selected stripe node to become the primary stripe node. In stage 606, the selected storage node computes the test generation. The test generation may comprise the next generation to be assigned (i.e. the generation that would be assigned to the next journal entry to be written to the journal or the first generation in the new epoch). In alternative embodiments, the test generation may comprise the greatest generation existing in the journal at the time of the feasibility determination. When the selected stripe node is not a node previously serving as a replica stripe node for stripe S, the test generation G may be zero.

In stage 607, the exemplary method determines whether a greatest generation corresponding to the stripe is greater than or equal to the test generation. If there is no generation corresponding to the stripe greater than or equal to the test generation, the method determines, in stage 609 that it is feasible for the selected stripe node to become the new primary stripe node. If there is a generation corresponding to the stripe greater than or equal to the test generation, the method determines, in stage 608, that it is not feasible for the selected stripe node to become the new primary stripe node. Exemplary embodiments of the forgoing method are described in greater detail below.

To accomplish the feasibility determination, in one illustrative embodiment, first, the selected stripe node determines the set of all storage nodes on the data storage system that participate in the stripe. In FIG. 2, for example, the subset for stripe 15 would comprise nodes 101, 201, and 301 because each of those nodes has a copy (a primary or replica) of stripe 15. The selected stripe node then determines the "power set" of the set, which comprises a subset for every combination of nodes containing at least one instance of the stripe and the empty set. For example, referring again to FIG. 2, the power set for stripe 15 comprises the following subsets of nodes: {101, 201, 301}, {101, 201}, {101, 301}, {201, 301}, {101}, {201}, {303}, and the empty set. For each subset in the power set, the replica stripe node determines whether the subset minimally satisfies a minimum durability policy. A subset that minimally satisfies the minimum durability policy has no smaller subset that also satisfies it. For example, referring again to FIG. 2 and stripe 15, if the journal corresponding to stripe 15 stored on disk drive 120, 220, and 310 are all at the equivalent generation X, and if the minimum durability policy is defined to require any two nodes to endorse an update, then the following are the subsets that minimally satisfy the minimum durability policy: {101, 201}, {101, 301}, and {201, 301}. The set {101, 201, 301} also satisfies the minimum durability policy, but it does not "minimally" satisfy the minimum durability policy because it contains proper subsets that also satisfy the minimum durability policy of two nodes having generation X.

Figure 6:
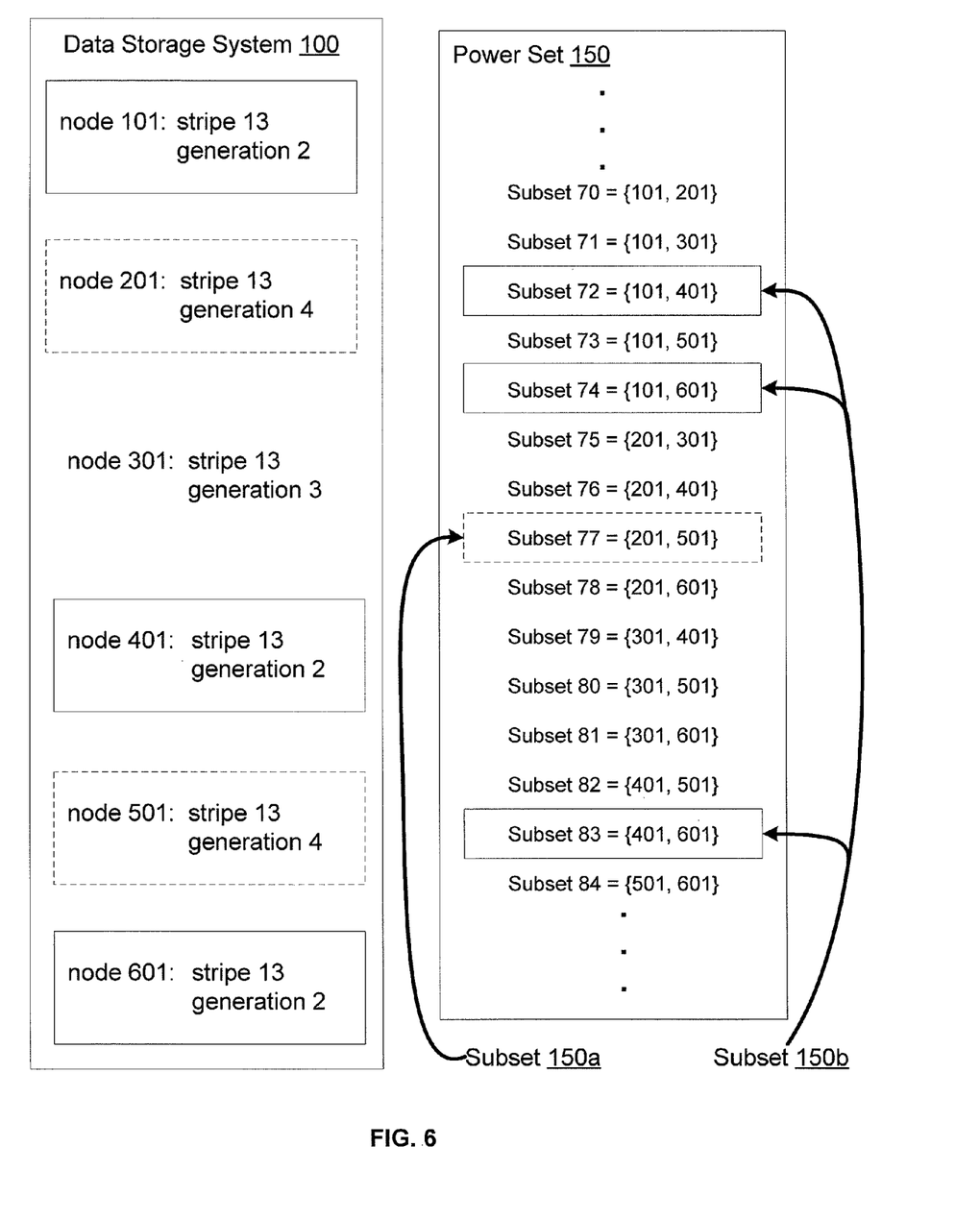
FIG. 6 illustrates an exemplary implementation of a minimum durability policy in the data storage system of FIG. 1, consistent with features and principles of the present invention.

FIG. 6 depicts a more complex example, where six nodes in data storage system 100 participate in stripe 13. Additional nodes (not shown) may exist in data storage system 100 that do not participate in the stripe 13 (i.e., there is no instance of stripe 13, either a replica or a primary, on the additional nodes). The power set 150 for stripe 13 is shown in FIG. 6 in abbreviated form for simplicity, but includes 2^6=64 subsets including the empty set, ranging from {101, 201, 301, 401, 501, 601}, {101, 201, 301, 401, 501}, {101, 201, 301, 401, 601} ... {101, 201} ... empty set. In the exemplary embodiment of FIG. 6, a minimum durability policy of "two" is implemented. For each subset that minimally satisfies the minimum durability policy, the selected stripe node determines whether the endorsements currently published by that subset would allow endorsement of a generation greater than G.

In FIG. 6, for example, subsets 70-84 comprise the subsets that minimally satisfy the minimum durability policy because in each subset, there are two copies of the stripe. For each of these subsets 70-84, the selected stripe node would determine whether the subset would allow endorsement of a generation greater than G. To determine whether the endorsements currently published by the subset would allow endorsement of a generation greater than G, the selected stripe node may, in some embodiments, consult its endorsement repository.

If the endorsements currently published by the subset minimally satisfying the minimum durability policy would allow endorsement of a generation greater than G, then it is infeasible for the node to become the new primary stripe node at this time. For example, referring to FIG. 6, if the minimum durability policy requires that there are two copies of a stripe on data storage system 100, and the test generation is generation 2, then the selected stripe node would evaluate each of the subsets 70-84 and find that subset 77 (also identified as subset 150a) allows endorsement of a generation greater than generation 2, namely, subset 77 allows endorsement of generation 4. Although subset 150b, comprising subsets 72, 74, and 83, has endorsed generation 2, at this time, it would be infeasible for the selected stripe node to become the primary stripe node. For another example, if the test generation is 4, the selected stripe node would recognize, during the feasibility determination, that none of the subsets 70-84 would allow endorsement of a generation greater than G. Therefore, in this example, it is feasible for the selected stripe node to become the primary stripe node.

The selected stripe node may periodically repeat this process, for example, once every commitment cycle, and potentially at some future time, the selected stripe node becomes the primary stripe node. Thus, referring to FIG. 6, with a test generation of 2 and a minimum durability policy of two copies of the stripe, upon finding that it is infeasible to become the new primary stripe node, the selected stripe node repeats the feasibility determination with a new test generation if one is available. The selected stripe node may have more entries in its stripe journal at a later point in time, and therefore generation G (the test generation) may be greater such that it is feasible for the selected stripe node to become the new primary stripe node. For example, if the test generation is 4 or greater in FIG. 6, it is feasible to become the new primary stripe node. In alternative embodiments, the configuration planner may issue a new stripe map when a selected stripe node determines that it is infeasible to become the new primary stripe node.

In one illustrative embodiment, the selected stripe node also ensures that all the nodes in the subset are "pinned," meaning that they have agreed not to endorse updates at any generation value greater than G before a final determination that it is feasible to become the new primary stripe node. This may be necessary because other nodes could otherwise be adding stripe journal entries during the feasibility determination. The selected stripe node may accomplish the "pinning" by sending a broadcast message to the other nodes having copies of the stripe, indicating that they should not endorse generations greater than G. In another embodiment, the endorsement messages periodically sent by other nodes, and recorded in the endorsement repository at the selected stripe node, may indicate that those other nodes have received copies of the new stripe map. The nodes may be configured to stop adding entries in their stripe journals in previous epochs once they learn of a new epoch, and therefore "pin" themselves. Therefore, by having received messages from the other nodes indicating they have received copies of the new stripe map, the selected stripe node need not send any message to pin the stripes as they have pinned themselves.

As explained in detail above, if all minimally satisfying subsets of the power set indicate feasibility, then it is feasible for the replica stripe node to become the new primary stripe node. This is true because there exists no collection of nodes that will endorse any update with a generation greater than G or less than the first generation of epoch E.

The following exemplary code (expressed in SUN MICROSYSTEMS' Java™) shows how a selected stripe node, N, may perform a feasibility determination.

```
public boolean isFeasible(final int stripeIndex,
final long currentGeneration, final long newGeneration) {
        final int epoch1 = epoch(currentGeneration);
        final int epoch2 = epoch(newGeneration);
        boolean hasEndorsement = false;
    for (int epoch = epoch2 - 1; epoch >= epoch1; epoch--) {
        final List<Node> configuredNodes = configuredNodes(stripeIndex,
            epoch);
        final Set<List<Node>> subsets = durableSubsets(configuredNodes);
        //
        // This variable will hold the maximum pinned generation at which
        // an update could be or will ever be ACKed within this epoch.
        //
        long maximumPinnedGeneration = 0;
        for (final List<Node> endorsingNodes : subsets) {
            //
            // This variable will hold the pinned generation of the lowest
            // generation endorsement within the current subset. This
            // subset could not and will not endorse update in the epoch
            // with a higher generation than this minimum value.
            //
            long minimumPinnedGeneration = Long.MAX_VALUE;
            //
            // Scan all the endorsements currently known for the nodes
            // in this subset to determine if any are pinned.
            //
            for (final Node node : endorsingNodes) {
                final Endorsement endorsement = currentEndorsement(node);
                if (endorsement != null) {
                    if (endorsement.isPinned(stripeIndex)) {
                        minimumPinnedGeneration = Math.min(
                            minimumPinnedGeneration, endorsement
                                .committedGeneration(stripeIndex));
                    }
                    if (epoch(endorsement.committedGeneration(stripeIndex))
    == epoch) {
                        hasEndorsement = true;
                    }
                }
            }
            //
            // This condition indicates that some set of nodes which
            // satisfied the minimum durability policy may have issued
            // endorsements at a generation larger than the one
            // at which this node is trying to preempt, or that no
            // nodes in the subset have been pinned.
            //
            if (minimumPinnedGeneration >= currentGeneration) {
                if (minimumPinnedGeneration == Long.MAX_VALUE) {
                    //
                    // If there's a subset that satisfies the MDP
                    // but has no pinned members, then issue a pin
                    // request and retry.
                    //
                    issuePinRequest(stripeIndex, currentGeneration);
                }
                return false;
            }
            //
            // For any subset of the nodes which satisfy the minimum
            // durability policy, if some endorsement from this subset
            // is pinned, then we can trust that at least this subset
```

```
        // will never endorse a higher generation within the epoch.
        // If all of the subsets meet this requirement, then no
        // update with a generation higher than the maximum pinned
        // generation will ever be acknowledged.
        //
        maximumPinnedGeneration =
        Math.max(maximumPinnedGeneration,
            minimumPinnedGeneration);
    }
    //
    // If this condition is true then we know that at least
    // some subset that satisfied the Minimum Durability Policy
    // endorsed an update from the current epoch. This could
    // only have happened if the plan that created this epoch
    // was feasible. Therefore, by induction, we do not need to
    // look at prior epochs to determine feasibility of the
    // new epoch.
    //
    if (epoch(maximumPinnedGeneration) == epoch) {
        return true;
    }
    //
    // If this condition is not true then the nodes for the
    // current epoch are pinned at some earlier generation.
    // This means they never realized the current epoch, so possibly
    // nodes in the previous epoch are endorsing at a generation
    // higher than this maximumPinnedGeneration value. Therefore
    // we also have to look at the nodes of the previous epoch in
    // the next iteration of the outer loop.
    //
  }
  return hasEndorsement;
}
```

The following exemplary code (expressed in SUN MICROSYSTEMS' Java™) shows an alternative embodiment demonstrating how a selected stripe node, N, may perform a feasibility determination.

```
public boolean isFeasible(final int stripeIndex,
        final long currentGeneration, final long newGeneration) {
    final int epoch2 = epoch(newGeneration);
    final int epoch1 = epoch(currentGeneration);
    for (int epoch = epoch2 - 1; epoch >= epoch1; epoch--) {
        final List<Node> nodes =
            configuredNodes(stripeIndex, epoch);
        final Set<List<Node>> subsets =
            durableSubsets(nodes);
        //
        // This variable will hold the maximum pinned generation at which
        // an update could be or will ever be ACKed within this epoch.
        //
        long maximumPinnedGeneration = 0;
        for (final List<Node> endorsingNodes : subsets) {
            //
            // This variable will hold the pinned generation of the lowest
            // generation endorsement within the current subset. This
            // subset could not and will not endorse update in the epoch
            // with a greater generation than this minimum value.
            //
            long minimumPinnedGeneration = Long.MAX_VALUE;
            //
            // Scan all the endorsements currently known for the nodes
            // in this subset to determine if any are pinned.
            //
            for (final Node node : endorsingNodes) {
                final Endorsement endorsement = currentEndorsement(
                    stripeIndex, node);
                if (endorsement != null) {
                    if (endorsement.isPinned(epoch2)) {
                        final long committedGeneration =endorsement.
                            getCommittedGeneration( );
                        //
                        // If the committed generation is less than our
                        // currentGeneration, then our journal is at least
                        // as good; this guarantees the
                        // maximumPinnedGeneration will not be less
                        // than the currentGeneration, and we will
                        // correctly return true once epoch1 is
                        // reached.
                        //
                        minimumPinnedGeneration = Math.min(
                            minimumPinnedGeneration, Math.max(
                                committedGeneration,
                                currentGeneration));
                    }
                }
            }
            //
            // This condition indicates that some set of nodes
            // which satisfied the minimum durability policy may have
            // issued endorsements at a generation greater than the one
            // at which this Node is trying to preempt, or that no
            // Nodes in the subset have been pinned.
            //
            if (minimumPinnedGeneration > currentGeneration) {
                //
                // If there's a subset that satisfies the MDP
                // but has no pinned members, then wait for
                // pinning to occur
                //
                return false;
            }
            //
            // For any subset of the Node which satisfy the
            // minimum durability policy, if some endorsement from this
            // subset is pinned, then we can trust that at least this subset
            // will never endorse a greater generation within the epoch.
            // If all of the subsets meet this requirement, then no update
            // with a generation greater than the maximum pinned
            // generation will ever be acknowledged.
            //
            maximumPinnedGeneration =
                Math.max(maximumPinnedGeneration,
                    minimumPinnedGeneration);
        }
        //
        // If this condition is true then we know that at least
        // some subset that satisfied the Minimum Durability Policy
        // endorsed an update from the current epoch. This could
        // only have happened if the plan that created this epoch
        // was feasible. Therefore, by induction, we do not need to
        // look at prior epochs to determine feasibility of the
        // new epoch.
        //
        if (epoch(maximumPinnedGeneration) == epoch) {
            return true;
        }
        //
        // If this condition is not true then the node for the
        // current epoch are pinned at some earlier generation.
        // This means they never realized the current epoch, so possibly
        // nodes in the previous epoch are endorsing at a
        // generation greater than this maximumPinnedGeneration value.
        // Therefore, we also have to look at the nodes of the
        // previous epoch in the next iteration of the outer loop.
        //
    }
    return false;
}
```

The methods disclosed herein are especially useful in computer systems utilizing an enterprise storage system, however, one of ordinary skill in the art will appreciate that the features and principles of the present invention may be implemented in various computer systems. One of ordinary skill in the art will also appreciate that features and principles of the present invention may be implemented in different components of a computer system with at least one associated data storage subsystem. Similarly, one of ordinary skill in the art will also appreciate that computer readable program code to implement a method consistent with features and principles of the present invention may be stored on various media, including various persistent memory devices.

The embodiments and aspects of the invention set forth above are only exemplary and explanatory. They are not restrictive of the invention as claimed. Other embodiments consistent with features and principles are included in the scope of the present invention. As the following sample claims reflect, inventive aspects may lie in fewer than all features of a single foregoing disclosed embodiment. Thus, the following claims are hereby incorporated into this description, with each claim standing on its own as a separate embodiment of the invention.

What is claimed is:

1. A computer-implemented method for determining feasibility of a selected stripe node becoming a new primary stripe node for a stripe in a data storage system, the data storage system comprising a plurality of nodes storing replicas of the stripe, the method comprising:
   computing a test generation for a journal associated with the selected stripe node and corresponding to the stripe, wherein the journal comprises entries that are assigned generations greater than previous entries; and
   comparing, by a feasibility module, a greatest generation corresponding to the stripe for each of the plurality of nodes storing replicas of the stripe with the test generation, and
      when the greatest generation for each of the plurality of nodes storing replicas of the stripe is less than the test generation, determining that it is feasible for the selected stripe node to become the new primary stripe node.

2. The method of claim 1, wherein the test generation comprises the generation that would be assigned to an entry that would be next recorded in the journal.

3. The method of claim 1, wherein the test generation comprises the greatest generation assigned to entries in the journal associated with the selected stripe node.

4. The method of claim 1, further comprising:
   when the greatest generation for any of the plurality of nodes storing replicas of the stripe is greater than or equal to the test generation, determining that it is not feasible for the selected stripe node to become the new primary stripe node.

5. The method of claim 1, wherein the greatest generation corresponding to the stripe for each of the plurality of nodes storing replicas of the stripe is stored in an endorsement repository at the selected stripe node.

6. The method of claim 1,
   wherein the plurality of nodes storing replicas of the stripe comprises a subset of the plurality of nodes storing replicas of the stripe, the subset having equivalent greatest generations corresponding to the replicas of the stripe,
   wherein the subset has a minimum number of replicas of the stripe, and
   wherein the minimum number is chosen to achieve a desired level of durability.

7. The method of claim 6, wherein
   when the greatest generation for the nodes in the subset is less than the test generation, determining that it is feasible for the selected stripe node to become the new primary stripe node; and
   when the greatest generation for any of the plurality of nodes storing replicas of the stripe is greater than or equal to the test generation, determining that it is not feasible for the selected stripe node to become the new primary stripe node.

8. The method of claim 1, wherein, prior to determining that it is feasible to become the new primary stripe node, each of the plurality of nodes storing replicas of the stripe communicates, to the selected stripe node, a commitment not to endorse generations greater than the test generation for the journal associated with the selected stripe node.

9. The method of claim 8, wherein the commitment not to endorse generations greater than the test generation for the journal associated with the selected stripe node comprises a message containing an epoch of a new stripe map.

10. The method of claim 1, wherein becoming the new primary stripe node comprises writing a first entry in the journal associated with the selected stripe node, the first entry being assigned the test generation.

11. The method of claim 1,
   wherein each of the plurality of nodes storing replicas of the stripe stores a stripe map, the stripe map comprising an indication of which of the plurality of nodes storing replicas of the stripe is a primary stripe node, and
   wherein the computing is triggered by receiving a new stripe map at the selected stripe node, wherein the new stripe map indicates that the selected stripe node is intended to become the new primary stripe node.

12. The method of claim 11,
   wherein prior to determining that it is feasible to become the new primary stripe node, each of the plurality of nodes storing replicas of the stripe communicates, to the selected stripe node, a commitment not to endorse generations greater than the test generation for the journal associated with the selected stripe node and corresponding to the stripe,
   wherein the new stripe map is associated with an epoch that is greater than any epoch for previous stripe maps, and
   wherein the commitment not to endorse generations greater than the test generation for the journal associated with the selected stripe node and corresponding to the stripe comprises a message containing the epoch of the new stripe map.

13. A data storage system comprising:
   a plurality of nodes storing replicas of a stripe;
   a selected stripe node having a journal corresponding to a stripe,
      wherein the journal comprises entries that are assigned generations greater than previous entries;
   a feasibility module comprising computer readable instructions for determining feasibility of the selected stripe node becoming a new primary stripe node for the stripe, wherein the determining feasibility comprises:
      computing a test generation for the journal corresponding to the stripe; and
      comparing, by the feasibility module, a greatest generation corresponding to the stripe for each of the plurality of nodes storing replicas of the stripe with the test generation, and
         when the greatest generation for each of the plurality of nodes storing replicas of the stripe is less than the test generation, determining that it is feasible for the selected stripe node to become the new primary stripe node.

14. The data storage system of claim 13, wherein the selected stripe node is one of a plurality of nodes storing replicas of a stripe.

15. The data storage system of claim 13, wherein the test generation comprises the generation that would be assigned to an entry that would be next recorded in the journal.

16. The data storage system of claim 13, wherein the test generation comprises the greatest generation assigned to entries in the journal associated with the selected stripe node.

17. The data storage system of claim 13, further comprising:
when the greatest generation for any of the plurality of nodes storing replicas of the stripe is greater than or equal to the test generation, determining that it is not feasible for the selected stripe node to become the new primary stripe node.

18. The data storage system of claim 13, wherein the greatest generation corresponding to the stripe for each of the plurality of nodes storing replicas of the stripe is stored in an endorsement repository at the selected stripe node.

19. The data storage system of claim 13,
wherein the plurality of nodes storing replicas of the stripe comprises a subset of the plurality of nodes storing replicas of the stripe, the subset having equivalent greatest generations corresponding to the replicas of the stripe,
wherein the subset has a minimum number of replicas of the stripe, and
wherein the minimum number is chosen to achieve a desired level of durability.

20. The data storage system of claim 19, wherein
when the greatest generation for the nodes in the subset is less than the test generation, determining that it is feasible for the selected stripe node to become the new primary stripe node; and
when the greatest generation for any of the plurality of nodes storing replicas of the stripe is greater than or equal to the test generation, determining that it is not feasible for the selected stripe node to become the new primary stripe node.

21. The data storage system of claim 13, wherein, prior to determining that it is feasible to become the new primary stripe node, each of the plurality of nodes storing replicas of the stripe communicates, to the selected stripe node, a commitment not to endorse generations greater than the test generation for the journal associated with the selected stripe node.

22. The data storage system of claim 21, wherein the commitment not to endorse generations greater than the test generation for the journal associated with the selected stripe node comprises a message containing an epoch of a new stripe map.

23. The data storage system of claim 13, wherein becoming the new primary stripe node comprises writing a first entry in the journal associated with the selected stripe node, the first entry being assigned the test generation.

24. The data storage system of claim 13,
wherein each of the plurality of nodes storing replicas of the stripe stores a stripe map, the stripe map comprising an indication of which of the plurality of nodes storing replicas of the stripe is a primary stripe node, and
wherein the computing is triggered by receiving a new stripe map at the selected stripe node, wherein the new stripe map indicates that the selected stripe node is intended to become the new primary stripe node.

25. The data storage system of claim 24,
wherein prior to determining that it is feasible to become the new primary stripe node, each of the plurality of nodes storing replicas of the stripe communicates, to the selected stripe node, a commitment not to endorse generations greater than the test generation for the journal associated with the selected stripe node and corresponding to the stripe,
wherein the new stripe map is associated with an epoch that is greater than any epoch for previous stripe maps, and
wherein the commitment not to endorse generations greater than the test generation for the journal associated with the selected stripe node and corresponding to the stripe comprises a message containing the epoch of the new stripe map.

26. A computer program product comprising a non-transitory computer usable medium having a computer readable program code stored therein, the computer readable program code configured to be executed to implement a method for determining feasibility of a selected stripe node becoming a new primary stripe node for a stripe in a data storage system, the data storage system comprising a plurality of nodes storing replicas of the stripe, the method comprising:
computing a test generation for a journal associated with the selected stripe node and corresponding to the stripe, wherein the journal comprises entries that are assigned generations greater than previous entries; and
comparing, by a feasibility module, a greatest generation corresponding to the stripe for each of the plurality of nodes storing replicas of the stripe with the test generation, and
when the greatest generation for each of the plurality of nodes storing replicas of the stripe is less than the test generation, determining that it is feasible for the selected stripe node to become the new primary stripe node.

27. The computer program product of claim 26, wherein the test generation comprises the generation that would be assigned to an entry that would be next recorded in the journal.

28. The computer program product of claim 26, wherein the test generation comprises the greatest generation assigned to entries in the journal associated with the selected stripe node.

29. The computer program product of claim 26, further comprising:
when the greatest generation for any of the plurality of nodes storing replicas of the stripe is greater than or equal to the test generation, determining that it is not feasible for the selected stripe node to become the new primary stripe node.

30. The computer program product of claim 26, wherein the greatest generation corresponding to the stripe for each of the plurality of nodes storing replicas of the stripe is stored in an endorsement repository at the selected stripe node.

31. The computer program product of claim 26,
wherein the plurality of nodes storing replicas of the stripe comprises a subset of the plurality of nodes storing replicas of the stripe, the subset having equivalent greatest generations corresponding to the replicas of the stripe,
wherein the subset has a minimum number of replicas of the stripe, and
wherein the minimum number is chosen to achieve a desired level of durability.

32. The computer program product of claim 31, wherein
when the greatest generation for the nodes in the subset is less than the test generation, determining that it is feasible for the selected stripe node to become the new primary stripe node; and
when the greatest generation for any of the plurality of nodes storing replicas of the stripe is greater than or equal to the test generation, determining that it is not feasible for the selected stripe node to become the new primary stripe node.

33. The computer program product of claim 26, wherein, prior to determining that it is feasible to become the new primary stripe node, each of the plurality of nodes storing replicas of the stripe communicates, to the selected stripe node, a commitment not to endorse generations greater than the test generation for the journal associated with the selected stripe node.

34. The computer program product of claim 33, wherein the commitment not to endorse generations greater than the test generation for the journal associated with the selected stripe node comprises a message containing an epoch of a new stripe map.

35. The computer program product of claim 26, wherein becoming the new primary stripe node comprises writing a first entry in the journal associated with the selected stripe node, the first entry being assigned the test generation.

36. The computer program product of claim 26,
wherein each of the plurality of nodes storing replicas of the stripe stores a stripe map, the stripe map comprising an indication of which of the plurality of nodes storing replicas of the stripe is a primary stripe node, and
wherein the computing is triggered by receiving a new stripe map at the selected stripe node, wherein the new stripe map indicates that the selected stripe node is intended to become the new primary stripe node.

37. The computer program product of claim 36,
wherein prior to determining that it is feasible to become the new primary stripe node, each of the plurality of nodes storing replicas of the stripe communicates, to the selected stripe node, a commitment not to endorse generations greater than the test generation for the journal associated with the selected stripe node and corresponding to the stripe,
wherein the new stripe map is associated with an epoch that is greater than any epoch for previous stripe maps, and
wherein the commitment not to endorse generations greater than the test generation for the journal associated with the selected stripe node and corresponding to the stripe comprises a message containing the epoch of the new stripe map.

* * * * *